Nov. 25, 1958   R. A. GROSSELFINGER ET AL   2,861,638
HELICOPTER POWER PLANT SYSTEM

Filed Sept. 19, 1957   6 Sheets-Sheet 1

INVENTORS
Jacques J. Schoch
Robert A. Grosselfinger

Nov. 25, 1958  R. A. GROSSELFINGER ET AL  2,861,638
HELICOPTER POWER PLANT SYSTEM
Filed Sept. 19, 1957  6 Sheets-Sheet 2

INVENTORS
Jacques J. Schoch
Robert A. Grosselfinger

Nov. 25, 1958  R. A. GROSSELFINGER ET AL  2,861,638
HELICOPTER POWER PLANT SYSTEM
Filed Sept. 19, 1957  6 Sheets-Sheet 3

INVENTORS
Jacques J. Schoch.
Robert A. Grosselfinger

Nov. 25, 1958  R. A. GROSSELFINGER ET AL  2,861,638
HELICOPTER POWER PLANT SYSTEM
Filed Sept. 19, 1957  6 Sheets-Sheet 5

INVENTORS
Jacques J. Schoch
Robert A. Grosselfinger

United States Patent Office 2,861,638
Patented Nov. 25, 1958

2,861,638

HELICOPTER POWER PLANT SYSTEM

Robert A. Grosselfinger, Washington, D. C., and Jacques J. Schoch, Bethesda, Md., assignors to Grovar, Incorporated, Washington, D. C., a corporation of Delaware Application September 19, 1957, Serial No. 685,365

3 Claims. (Cl. 170—135.73)

This invention relates to rotary wing aircraft, and more particularly to power plant systems for helicopters and the like in which the combined lifting and controlling rotors are driven by gas turbine power plants.

In general, the control of helicopter power plant systems is influenced to a great extent by certain practical considerations with respect to overall helicopter flight operations. One of the most important of such considerations is that the pilot must at all times be able to exercise direct manual control of the rotor blade angle, since not only does rotor blade angle or collective pitch control provide the most direct correlation with thrust and hence lift, but of even greater importance is the fact that such direct control permits the pilot to maintain control of the helicopter through auto-rotation of the rotor in case of engine failure. Such latter consideration has as a practical matter prevented any use of a helicopter control system wherein the collective pitch control is automatically coordinated with the engine control. As a result, the heretofore known control for helicopter power plant systems consisted of a power plant speed control which was entirely independent of the essential direct manual control of blade angle, and the pilot's controls relating to power plant operation have consisted of a collective pitch control as well as a throttle or turbine speed control both of which controls have had to be operated more or less simultaneously, and this in addition to the various flight controls such as cyclic pitch, rudder, etc.

Accordingly, it is an object of the present invention to provide a single power system control for the pilot which control will directly operate the rotor blade angle while simultaneously automatically operating the power plant. Thus, the pilot is for the first time enabled to control the power system through the essential direct control of rotor blade angle without the necessity of simultaneous operation of a plurality of controls affecting the power system.

It is a feature of the invention that by its use the helicopter power plant system is automatically operated according to a predetermined relationship between selected turbine and rotor system operating characteristics, enabling it to be operated, for example, along the maximum efficiency operating curve of the turbine and rotor system if so desired.

It is a further feature of the invention that, by its use, power plant control connecting linkages between the cockpit and the turbine such as throttles and the like are entirely eliminated, thereby greatly simplifying power plant installation.

For the purpose of fully describing preferred embodiments of our invention, reference is now made to the following specification together with the accompanying drawings in which.

Figure 1:
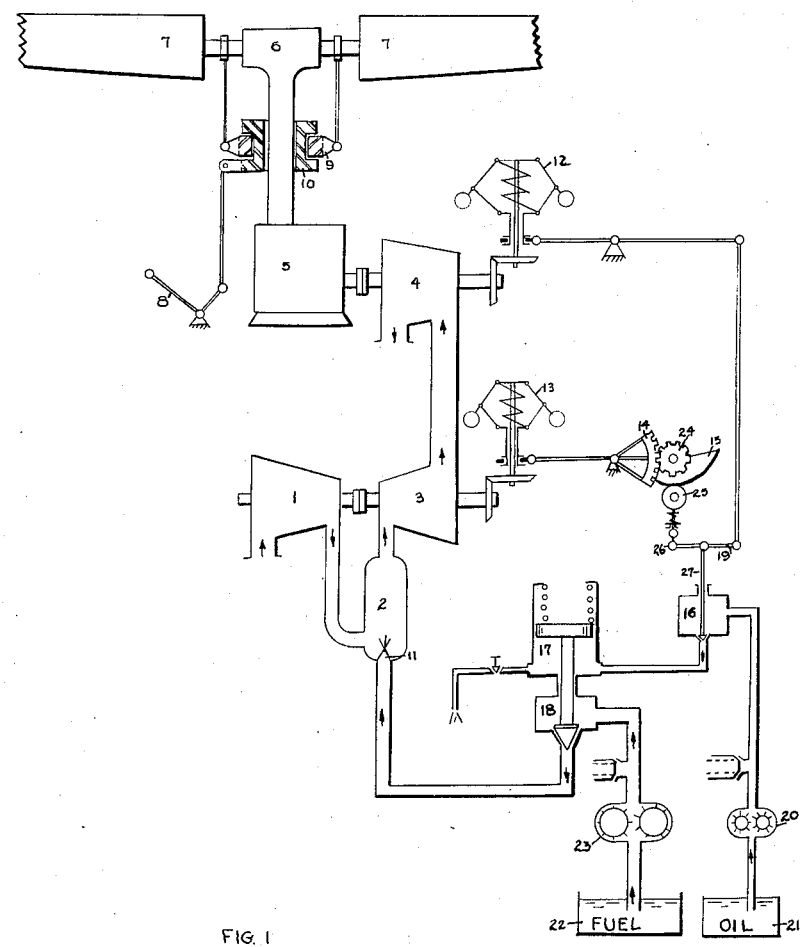
Fig. 1 is a diagrammatic view of a power plant control system embodying our invention.
Figure 2:
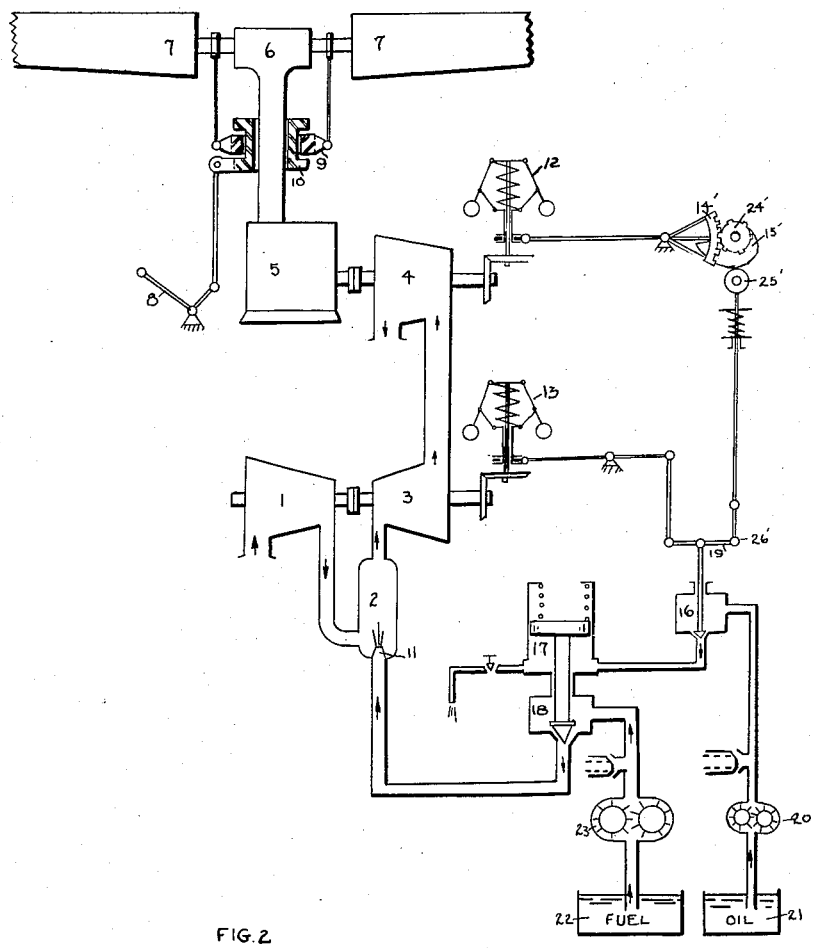
Fig. 2 is a diagrammatic view of a system somewhat modified from that of Fig. 1.

Referring first to Figs. 1 and 2, the invention may be used with any one of a number of types of turbine power plants, that shown in Figs. 1 and 2 being of the type having a gas generator portion and a power turbine portion mechanically independent thereof and energized by the hot gases therefrom, fuel normally being supplied only to the gas generator portion of the turbine. In such a turbine power plant, atmospheric air enters the gas generator compressor 1 where it is compressed to some desired pressure. The compressed air then passes to the combustion chamber 2 where fuel is introduced through fuel nozzle 11 and is burned in the compressed air to obtain a desired turbine inlet temperature. The combustion gases and excess air then enter the gas generator high pressure turbine 3 and are partially expanded to provide the energy to drive the gas generator compressor 1 connected to said turbine 3. The partially expanded gas-air mixture is then passed to the power turbine portion of the turbine power plant and is further expanded through the power turbine low pressure turbine 4, which turbine is mechanically independent of the compressor-high pressure turbine combination. The power derived in the expansion through the power turbine low pressure turbine 4 is transmitted through a gear box 5 in which the drive speed is reduced for application of the available power to the rotor shaft 6. Other types of turbine power plants, such as for example the single shaft type of turbine, may as well be used with the invention, all as hereinafter more fully explained, all of such turbines being well understood in the art.

Figure 10:
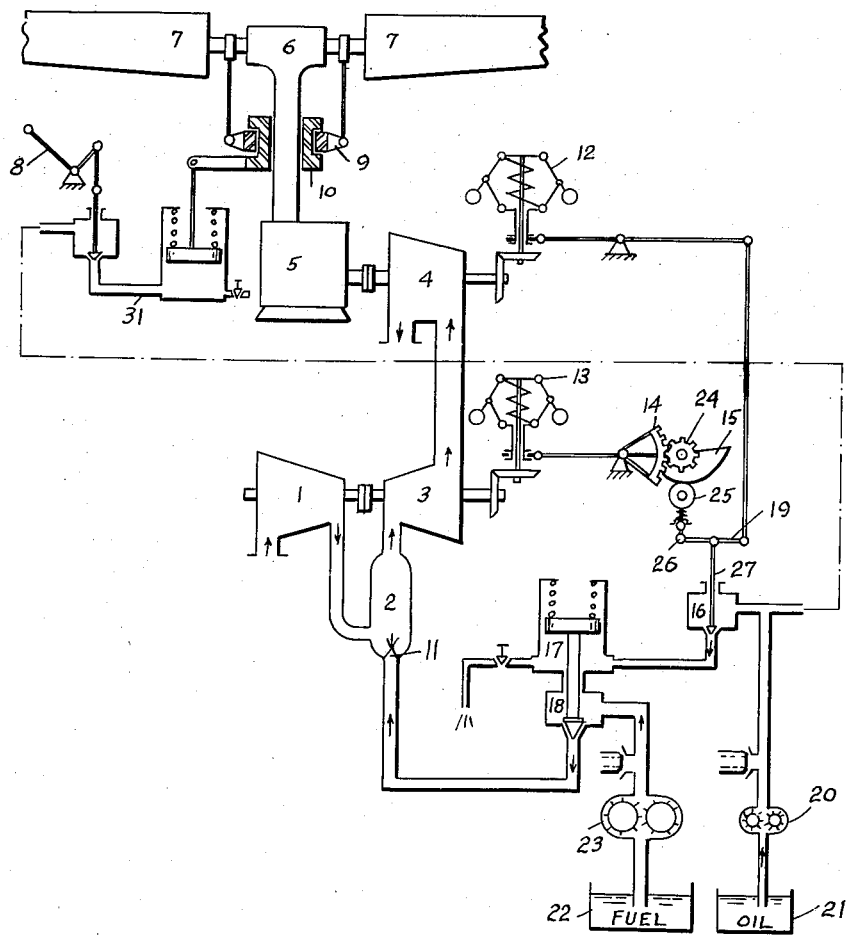
Fig. 10 is a diagrammatic view somewhat modified from that of Fig. 1.

The rotor provided is of the usual type of combined control and lifting helicopter rotor having controllable pitch blades 7 mounted for rotation on the generally upright shaft 6. The collective pitch angle of said blades may be directly controlled manually by means of a pilot's lever 8 operating through a rotating sleeve 9 having suitable linkages for controlling the pitch angle of said blades 7 and a cooperating fixed sleeve 10 having suitable linkages to the pilot's lever 8 so that the collective pitch of the blades 7 may at all times be directly controlled by the pilot whether or not the power turbine is providing a power output. If desired, as shown in Fig. 10, an actuator 31 may be interposed between pilot's lever 8 and sleeve 10. Such controllable pitch rotors having collective pitch control means are well understood in the rotary wing aircraft art and need not herein be further explained.

Figure 3:
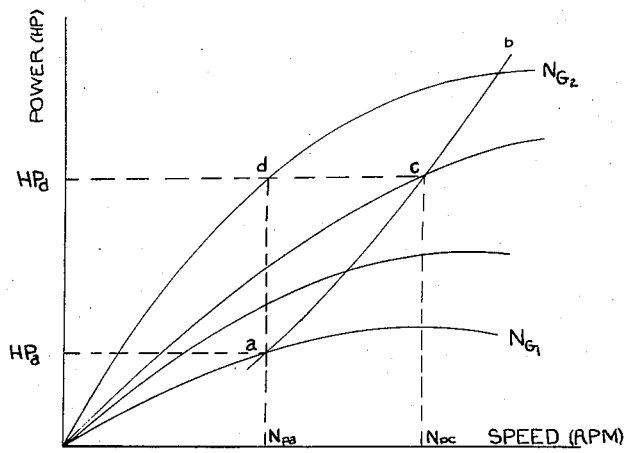
Fig. 3 is a graph representing performance characteristics typical of the turbine power plant of the type of Figs. 1 and 2.

In Fig. 3 is shown a graphical representation of the performance characteristics typical of the above-described type of turbine power plants wherein the horsepower output of the power or low pressure turbine is plotted against the power turbine speed with speeds of the gas generator or comprsesor-high pressure turbine combination plotted as parameters.

Referring now to the heretofore known turbine power plant control systems employing two controls as above described, assume point $a$ on the graph of Fig. 3 to be the initial steady state power point. If a higher power was desired, the pilot, by operating his collective pitch control lever could attain a range of power output at a power turbine speed $N_{pa}$ which was usually maintained substantially constant either by his simultaneously operating a throttle or by means of an automatic speed control which controlled the fuel flow to the gas generator to maintain constant speed independently of blade angle, the operation in either case being shown by line $a$—$d$ of Fig. 3. However, even with a system employing a speed control, in order to derive desired powers at optimum efficiency as shown by the line $a$—$b$ of Fig. 3, rather than at constant speed, it was necessary for the pilot to manipulate more or less simultaneously both power plant control levers, that is the collective pitch control lever and the throttle or speed control lever.

As a more detailed example of heretofore known practice, consider an increase in power from $HP_a$ to $HP_c$ or $HP_d$ assuming the power turbine speed to be $N_{pa}$. In such case the rotor blade angle was usually increased with the power turbine speed lever left unchanged. However, under such conditions, the power turbine speed was then temporarily reduced causing a greater fuel flow because of the speed control, and the higher energy level available would then increase the speed of the gas generator to a speed $N_{G2}$, as well as indirectly lifting the energy level to the power turbine, until such time as the power turbine speed regained the speed $N_{pa}$ at the higher blade angle and the power output $HP_d$ was derived. This power, however, was derived at other than optimum efficiency and could only be derived at optimum efficiency by resetting the speed control to a power turbine speed $N_{pc}$ in order that the same power $HP_d$ be attained but at optimum power plant system efficiency. Thus it may be seen that simultaneous manipulation of rotor blade angle and speed control was required to remain on an overall optimum operating line such as $a$—$b$ and such required prolonged manipulation of power plant system controls was at the expense of the manipulation of normal flight controls.

According to our invention, we employ power plant system control means, for example, including a function generator of mechanical or other type, responsive to changes in at least two selected turbine operating characteristics, to maintain a predetermined relationship therebetween by controlling the fuel flow to the turbine. The turbine power plant system operating characteristics, any two of which may be employed for its control, are, for example, turbine speeds, temperatures, pressures and combinations thereof, which characteristics are varied by changes in, for example, turbine load or fuel flow. Thus the turbine power plant system, which term is intended to include the turbine-rotor system as well as factors other than normal engine operating controls which effect the load thereon, particularly the collective pitch control, is automatically controlled in accordance with any desired relationship, for example a relationship corresponding to a curve of optimum turbine-rotor efficiency, by load changes incurred by changes in rotor blade angle as directly controlled by a pilot.

With our novel arrangement, the fuel flow to the turbine power plant is hence directly controlled solely by selected turbine operating characteristics, which characteristics are indirectly affected by changes in load caused by changes in rotor blade angle. Thus, the turbine power plant and its associated controls may be made as a complete unit, unconnected with the helicopter lifting and control rotor collective pitch or other controls. Yet at the same time, automatic operation is provided, for example, at optimum efficiency, whatever the load condition.

Referring again to Fig. 1, and especially to the turbine power plant control means therein shown, a conventional flyball governor 12 is driven through suitable gears by the power turbine 4 and provides a speed sensing device for said power turbine, which speed is a typical turbine operating characteristic which may be selected for its control. Movement of the sleeve of such governor (which movement is proportional to the speed of the power turbine) is transmitted through a suitable linkage to one end of the arm 19 of a comparison generator, the center of which arm is connected through a link 27 to operate a pilot valve 16 which together with servo valve 17 and main fuel valve 18 provide a fuel flow control to regulate the fuel flow to the fuel nozzle 11 in the combustion chamber 2. The pilot valve 16 and servo valve 17 are provided with a suitable source of operating fluid through pump 20 and reservoir 21 and fuel is supplied to main fuel valve 18 from a tank 22 by means of pump 23.

A second flyball governor or speed sensing means 13 is operated from the shaft of the gas generator turbine 3 through suitable gears and provides a displacement proportional to the gas generator speed, which speed provides a second turbine operating characterisic which may be selected for its control, although other turbine operating characteristics, such as turbine inlet temperature, could be used if desired. Such displacement is transmitted through suitable linkage to toothed quadrant member 14 arranged to drive a rotatably mounted pinion 24. A cam 15 mounted on a common shaft with said pinion is provided as a function generator, such cam defining a predetermined relationship between the gas generator and power turbine speeds to provide a desired operating relationship between such selected operating characteristics, as shown by the line $a$—$b$ in Fig. 3, for example, so that movement of cam follower 25 associated with such cam 15 is in terms of the speed of the power turbine 4, such movement being transmitted to the other end of arm 19 through linkage 26. The displacement of linkage 26 at one end of arm 19 represents a desired power turbine speed as a function of the predetermined relationship, for example, expressed by the line $a$—$b$ of Fig. 3, and such displacement is in effect added or subtracted from the displacement of said arm caused by the power turbine linkage. As a result, any combination of gas generator and power turbine speeds inconsistent with the relationship established by the line $a$—$b$ will result in movement of link 27 mounted at the center of arm 19 and hence in a displacement of pilot valve 16 which will cause the fuel flow to vary until such time as the relative speeds are consistent with the desired relationship as established by the function generating cam 15.

Referring again to Fig. 3 in order to show the operation of the above-described structure, it may first be assumed that the initial steady state operating point is point $a$. If the pilot increases the rotor blade angle through manipulation of his collective pitch control lever 8, the increased load on the power turbine 4 will cause it to decrease speed. Such decrease in speed is sensed by the speed sensing devices 12 and 13 which will result in an upward movement of the pilot valve 16 and an increase in fuel flow to the gas generator combustion chamber. The speed of the gas generator then increases due to the increase in its turbine inlet temperature. Such increase in speed is sensed by the gas generator speed sensing device 13 as a displacement applied to the cam 15. Since an increased gas generator speed requires a higher power turbine speed in accordance with the relationship expressed by the line $a$—$b$ of Fig. 3, the relationship for which is provided in the cam 15, linkage 26 will displace its end of comparison generator arm 19 upward. As a result, the center of said arm will rise to open the fuel valve and the fuel flow will be further increased. Both gas generator and power turbine speeds will thus be increased until such time as the new load imposed by the increased blade angle is provided for by the power plant at a speed relationship in accordance with the cam 15 and the line a—b which it represents.

Figure 4:
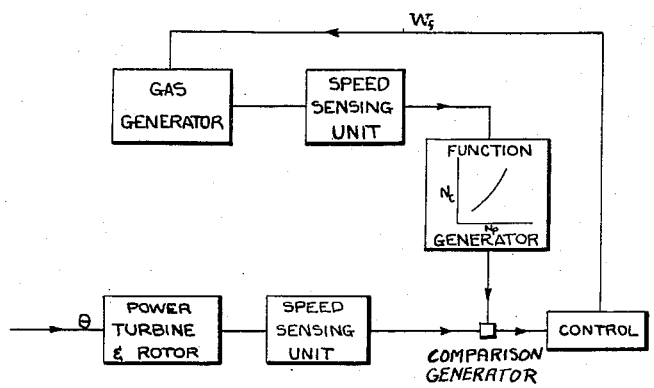
Fig. 4 is a block diagram of the control system of Fig. 1.

The operation of the system of the invention can perhaps be more clearly explained by means of the block diagram of Fig. 4. Again, assuming the initial steady state point to be a on Fig. 3 and that an increase in rotor blade angle is accomplished by the lever 8, the power turbine speed will be decreased due to the increased load and this speed will be continually sensed by the power turbine sensing device. Momentarily, $N_{pa}$ is constant and the error between the actual $N_p$ and $N_{pa}$ is sensed by the comparison generator causing the fuel flow control to increase fuel flow to the gas generator. The gas generator speed then increases due to the increase in fuel flow and the new speed is sensed by its sensing device. The output signal thereof is introduced to the function generator which computes the corresponding power turbine speed for the generator speed in accordance with the predetermined relationship line a—b, such relationship being provided by the function generator which provides an output in terms of the output of the sensing device for the power turbine, the outputs of both the function generator and the power turbine sensing device being fed into the comparison generator to control the fuel flow to the gas generator. Thus, the increase in the demand power turbine speed originating from the function generator in effect resets the desired power turbine speed and this process continues until the new load is driven at some new point on the line a—b or point c of Fig. 3.

Figure 5:
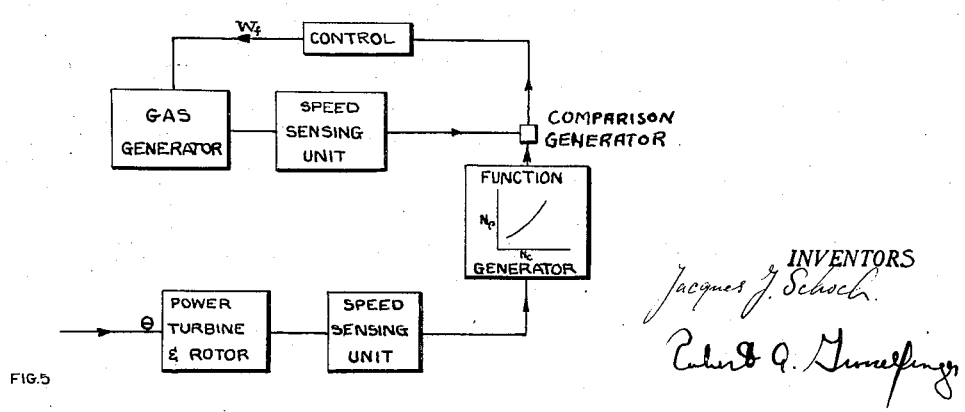
Fig. 5 is a block diagram of the control system of Fig. 2.

The system described in the foregoing can be modified as shown in Fig. 2, which system is functionally the same as that shown in Fig. 1. In this system both the gas generator and power turbine are again provided with speed sensing units, but in this arrangement the gas generator speed is computed from the power turbine speed by means of a function generating cam 13' operated by the power turbine speed sensing device. The applicable block diagram for the modified arrangement is shown in Fig. 5.

In operation, assuming the initial steady state speed point to be a on Fig. 3 and an increase in rotor blade angle is accomplished by the lever 8, the power turbine speed will be decreased due to the increased load and such speed is continually sensed by the power turbine speed sensing device. The power turbine speed signal from such device is introduced to the function generating cam which computes the gas generator speed for the predetermined relationship as, for example, according to line a—b of Fig. 3. The output of the function generating cam and the gas generator sensing device is fed to a comparison generator which introduces the speed error between the actual gas generator speed and the computed speed to the turbine fuel flow control which then increases the fuel flow causing the gas generator speed to increase and raising the energy level to the power turbine which in effect resets the desired generator speed. This process continues until the new load is driven, for example, to point c on the line a—b.

Figure 6:
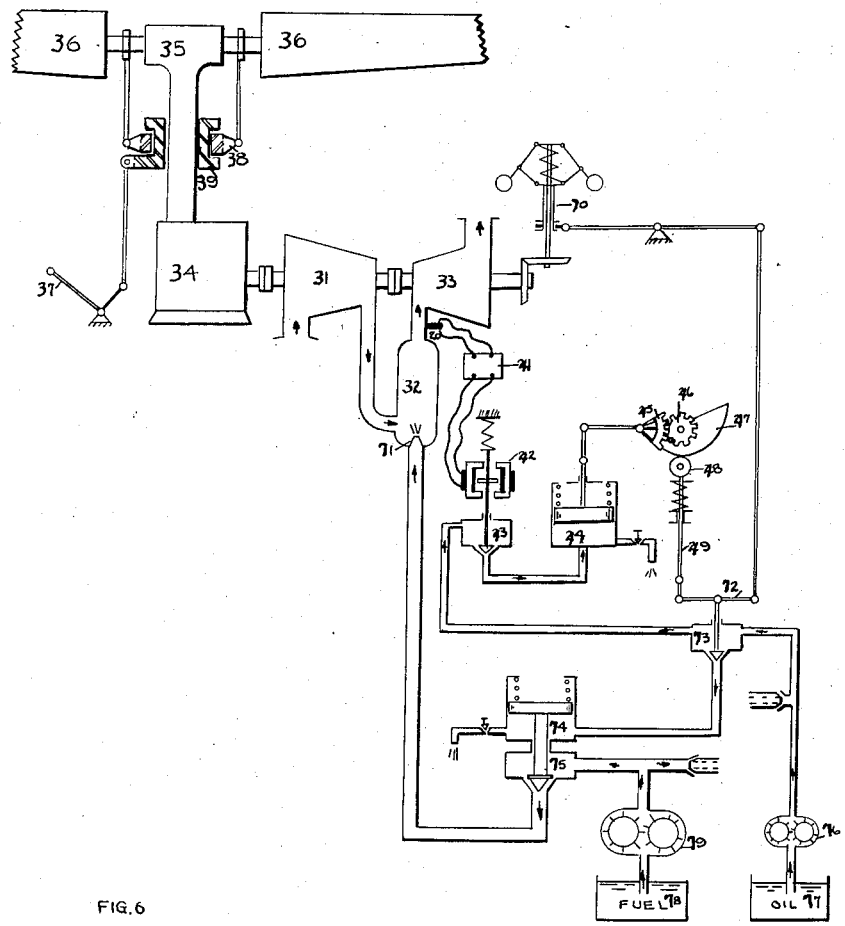
Fig. 6 is a diagrammatic view of a modified power plant control system of our invention.

Referring now to Fig. 6, the invention is shown as applied to a single shaft turbine power plant in which the compressor section and the turbine section are directly, mechanically connected. In such a turbine power plant, atmospheric air enters the engine compressor 31 where it is compressed to some desired pressure. The compressed air then passes to the combustion chamber 32 where fuel is introduced through fuel nozzle 71 and is burned in the compressed air to obtain a desired turbine inlet temperature. The combustion gases and excess air then enter the turbine 33 where they are expanded to provide energy to drive the compressor 31 as well as to provide excess energy available for transmission through a gear box 34 in which the drive speed is reduced in a known manner for application of available power to the rotor shaft 35, the rotor provided being of the usual type heretofore described having controllable pitch blades 36 mounted for rotation on upright shaft 35. The collective pitch angle of the blades may be directly controlled by means of a pilot's lever 37 operating by means of a rotating sleeve 38 and a fixed sleeve 39.

Figure 7:
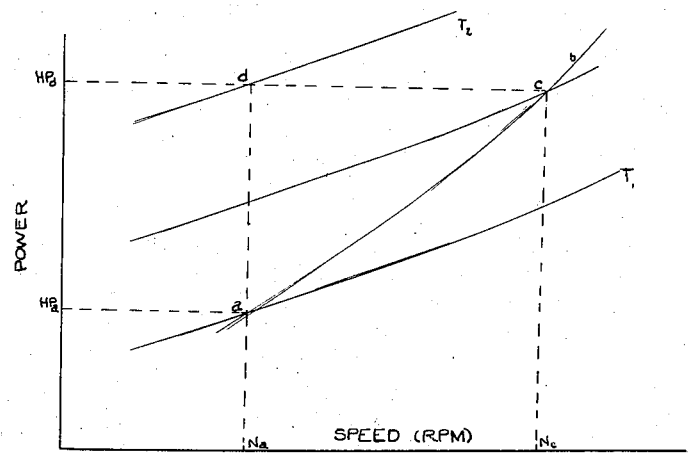
Fig. 7 is a graph representing performance characteristics typical of the turbine power plant of the type of Fig. 6.

In Fig. 7 is shown a graphical representation of the performance characteristics typical of the above-described turbine power plant wherein the horsepower output of the power plant system is plotted against the power plant system speed with turbine inlet temperatures plotted as parameters.

Referring again to Fig. 6 and especially to the turbine power plant control means therein shown, a conventional flyball governor 70 is driven through suitable gears by the turbine 33 and provides a speed sensing device for said turbine power plant, which speed is a typical turbine power plant operating characteristic which may be selected for its control. Movement of the sleeve of governor 70 is transmitted through a suitable linkage to one end of the arm 72 of a comparison generator, the center of the arm 72 of which is connected through a link to operate a pilot valve 73 which together with a servo valve 74 operates main fuel valve 75 to regulate the fuel flow to the fuel nozzle 71 in the combustion chamber 32. The pilot valve 73 and servo valve 74 are provided with a suitable source of operating fluid through pump 76 and reservoir 77, and fuel is supplied to main fuel valve 75 from a tank 78 by means of pump 79.

To provide a second turbine power plant operating characteristic in the arrangement employing a single shaft type of turbine, we prefer to select turbine inlet temperature, such temperature being sensed by a thermocouple 40 whose output is amplified by the amplifier 41 in a known manner, although other turbine operating characteristics, such as compressor pressure ratio, could be used. The amplifier output according to our invention is arranged to control a positioning solenoid 42 which introduces the temperature signal to a pilot valve 43 which, together with servo valve 44, provides a displacement proportional to the turbine inlet temperature. Such displacement is transmitted through suitable linkage to a toothed quadrant member 45 which drives a rotatably mounted pinion 46. A cam 47 mounted on a common shaft with said pinion is provided as a function generator, such cam defining a predetermined relationship between the turbine power plant system speed and the turbine inlet temperature to provide a desired operating relationship between such selected operating characteristics, as shown by the line a—b in Fig. 7, for example, so that movement of the cam follower 48 associated with such cam 47 is in terms of the speed of the turbine power plant, such movement being transmitted to the other end of arm 72 through linkage 49. Thus the displacement of linkage 49 at one end of arm 72 represents a desired turbine power plant speed as a function of the predetermined relationship. This displacement is in effect added or subtracted from the displacement of said arm caused by turbine power plant speed linkage, and as a result, any combinations of turbine inlet temperature and turbine power plant speed inconsistent with the relationship established by the line a—b will result in movement of the pilot valve 73 mounted at the center of arm 72 and hence in a displacement of the servo valve 74 which causes the fuel flow to vary until such time as the turbine power plant speed and the turbine inlet temperature are consistent with the desired relationship as established by the function generating cam 47.

Figure 8:
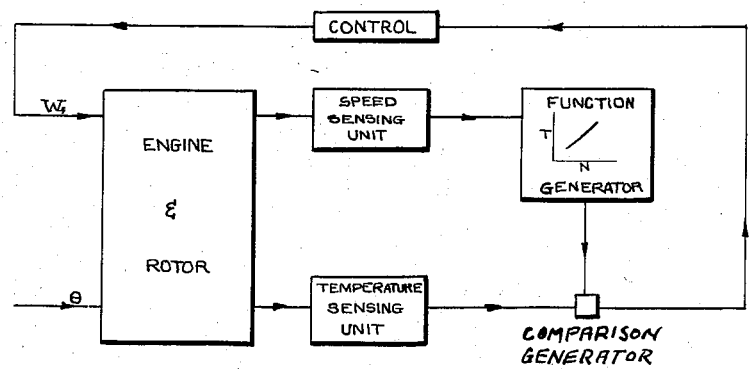
Fig. 8 is a block diagram of a system somewhat modified from that of Fig. 6.
Figure 9:
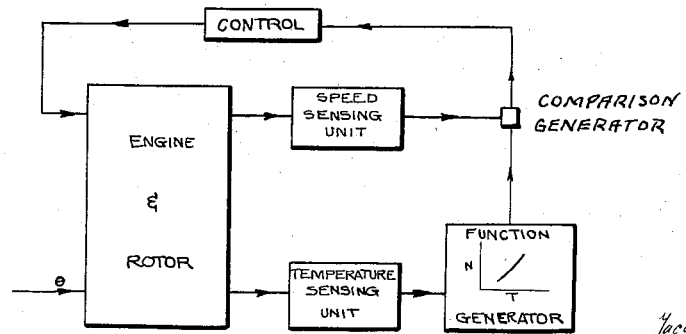
Fig. 9 is a block diagram of the control system of Fig. 6.

The block diagrams of Figs. 8 and 9 show the arrangement of our invention as used with a single shaft type of turbine wherein turbine speed and turbine inlet temperature are selected as the operating characteristics, the arrangement of Fig. 8 being somewhat modified from that of Fig. 6 in that the output of the speed sensing unit is arranged to operate the function generator, the output of the temperature sensing means being applied directly to the comparison generator.

Thus it will be seen that by our invention we are enabled for the first time to control the entire helicopter turbine power plant system solely through the essential direct control of the rotor blade collective pitch angle. Thus only a single power plant system lever is needed for pilot use. Furthermore, our invention for the first time permits the pilot to manipulate the blade angle directly both normally and in any emergency such as engine failure while at the same time attaining any predetermined operating relationship between selected power plant system operating characteristics, which relationship normally is a curve combining optimum engine-rotor efficiency.

This application is a continuation-in-part of our earlier filed application Serial No. 418,654, filed March 25, 1954, now abandoned.

Various other modifications within the spirit of our invention and the scope of the appended claims and not herein described will be apparent to those skilled in this art.

We claim:

1. In a rotary wing aircraft, a turbine power plant, fuel flow control means for said turbine power plant effective to vary the power thereof, a controllable pitch rotor mounted for rotation about a generally upright axis and driven by said turbine power plant, manual pitch control means for directly controlling the blade angle of said rotor, a first sensing means for sensing a first operating characteristic of said turbine power plant, a second sensing means for sensing a second operating characteristic of said turbine power plant, function generator means providing a predetermined relationship between said first and second operating characteristics, said means being operatively connected to at least one of said sensing means to provide an output in terms of the output of said second sensing means, and comparison generator means for comparing the output of said function generator and said second sensing means to control said fuel flow control means whereby the power of said turbine power plant will be automatically varied in accordance with said relationship by load changes incurred by changes in rotor blade angle.

2. In a rotary wing aircraft, a turbine power plant including a power turbine and a gas generator energizing said power turbine, fuel flow control means for said gas generator effective to vary the power of said power turbine, a controllable pitch rotor mounted for rotation about a generally upright axis, and driven by said power turbine, pitch control means for directly controlling the blade angle of said rotor, means for sensing the speed of said gas generator, means for sensing the speed of said power turbine, function generator means providing a predetermined relationship between said gas generator speed and power turbine speed, said means being operatively connected to at least one of said speed sensing means to provide an output in terms of the output of the other of said speed sensing means, comparison generator means for comparing the output of said function generator and said other speed sensing means to control said fuel flow control means whereby the power of said power turbine will be automatically varied in accordance with said relationship by load changes incurred by changes in rotor blade angle.

3. In a rotary wing aircraft as claimed in claim 1 wherein said turbine power plant is a single shaft turbine power plant, and said first and second operating characteristics are turbine speed and temperature of the inlet gases to the turbine.

References Cited in the file of this patent

UNITED STATES PATENTS

| | | |
|---|---|---|
| 2,616,507 | Greenland | Nov. 4, 1952 |
| 2,631,677 | Kochenburger et al. | Mar. 17, 1953 |
| 2,688,844 | McLeod et al. | Sept. 14, 1954 |
| 2,727,357 | Hazen | Dec. 20, 1955 |
| 2,759,549 | Best | Aug. 21, 1956 |
| 2,807,138 | Torell | Sept. 24, 1957 |